June 25, 1935. E. HOPKINSON 2,006,315
AUTOMOBILE TIRE
Filed June 10, 1932 2 Sheets-Sheet 1

INVENTOR.
ERNEST HOPKINSON
BY
ATTORNEYS.

June 25, 1935.  E. HOPKINSON  2,006,315
AUTOMOBILE TIRE
Filed June 10, 1932   2 Sheets-Sheet 2

INVENTOR.
ERNEST HOPKINSON
BY
ATTORNEYS.

Patented June 25, 1935

2,006,315

UNITED STATES PATENT OFFICE 2,006,315

AUTOMOBILE TIRE

Ernest Hopkinson, New York, N. Y., assignor, by mesne assignments, to United States Rubber Company, New York, N. Y., a corporation of New Jersey Application June 10, 1932, Serial No. 616,385

7 Claims. (Cl. 152—13)

My invention relates to automobile tires, and more particularly to automobile tires intended for use with heavy loads, such as on trucks and busses, although it is to be understood that certain features of the tire may be embodied in smaller sized tires.

In the manufacture of automobile tires it is customary practice to build up a tire carcass by superimposing a plurality of plies of rubberized fabric, which plies are wrapped around bead wires. The plies are treated, usually skim coated, with a rubber composition which is softer than the tread rubber used in such tires. One or more breaker strips, which are treated with soft rubber, are placed on top of the outermost carcass layer and the tread stock is placed over the breaker strip and the carcass. Such breaker strips have usually had a width corresponding roughly to the tread width of the tire. For tires supporting small loads, the termination of breaker strips at substantially the shoulders of the tire is not particularly disadvantageous. However, with tires intended to support very heavy loads, the termination of the breaker strips at the shoulders produces areas of excessive strain at their edges which are liable to cause the separation of the rubber at the edges of the breaker strips. As such breaker strips have generally heretofore been covered with soft rubber corresponding to the rubber used in the carcass of the tire, the tread stock was bonded to the rubber around the breaker strip and the rubber on the breaker strip was bonded to the carcass rubber therebeneath. In heavy duty tires tread separation frequently occurs directly at and/or below the breaker strip due to imperfect bonding of the tread stock with the stock on the breaker strip or due to imperfect bonding of the rubber on the breaker strip with the carcass rubber.

In previous tire constructions it has been customary to merely cover the successive plies of the carcass with a skim coating of rubber so that all the plies, after vulcanization, lie very close together and the small amounts of rubber between the successive plies serve primarily as bonds. Accordingly, severe blows, which tend to migrate beyond the breaker strip or strips, are delivered directly to the carcass plies which collectively are rather rigid and inflexible.

I provide an automobile tire for heavy or severe service in which the carcass is built up by a plurality of superimposed rubber coated layers of fabric. Preferably, the fabric is in the form of spaced parallel cords with the cords in adjacent plies extending at angles to one another so as to "balance" the tire. The fabric plies of the carcass are all wrapped around the tire beads.

In order to cushion the carcass, the outer plies are separated by cushioning pads of rubber of a thickness materially in excess of the thickness of the skim coatings on the inner plies. The interposition of such rubber pads serves to cushion blows severe enough to pass through the tread and breaker strips thereby tending to prevent the separation of the outer plies from each other. In order to properly embed the outer carcass ply in the cushioning rubber, I space the cords in the outer ply or plies further apart than are the cords in the inner plies. This permits the rubber of the cushioning pads to pass through interstices of the ply and become firmly bonded, thereby in effect embedding the outer ply in the cushioning stock.

In lieu of the breaker strip or strips heretofore limited in width to substantially the crown of the tire, I extend one or more protective plies around the tire from one bead heel to the other. The cords of the protective plies are spaced apart further than are the cords of the inner carcass plies, thereby forming wide interstices between the cords. The protective plies are treated, preferably skim coated, with a rubber stock having the characteristics of the tread stock. Accordingly, when the tread stock is applied over the protective plies, the tread stock merges with the coating on the protective plies and the protective plies are in effect embedded in the tread stock. The line of juncture between the tread rubber and the carcass rubber is thereby formed beneath the protective plies. The presence of substantial bodies of rubber between the cords of the protective plies and the presence of the cushioning pads of rubber around the outer carcass ply or plies forms a cushion between the inner carcass plies and the tread which cushion tends to absorb blows severe enough to pass through the protective plies and into the carcass, as distinguished from delivering such blows directly to a carcass in which the outer plies are not so embedded in cushioning rubber. The widths of the cushioning plies preferably increase inwardly of the tire so that the amount of cushioning stock in the side walls of the tire gradually decreases from the center of the tread to substantially the center of the side walls of the tire where the carcass plies are brought together by the progressive termination of the cushion pads. This construction produces good conditions of tire flexibility and bonding adherence.

The accompanying drawings illustrate a present preferred embodiment of the invention in which.

Figure 1:
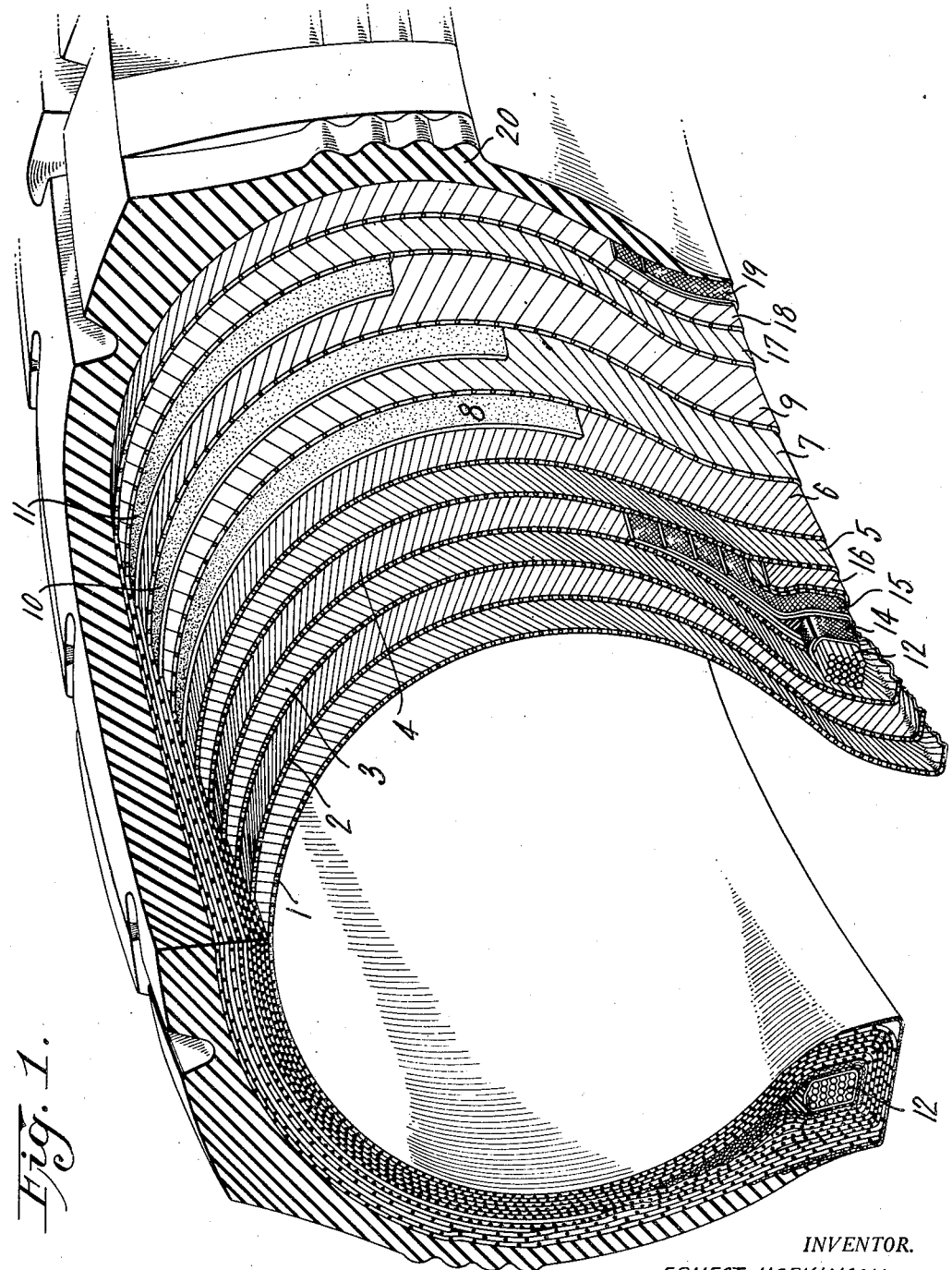
Figure 1 is a perspective view partially in elevation and partially in section of a portion of a tire embodying my invention.
Figure 2:
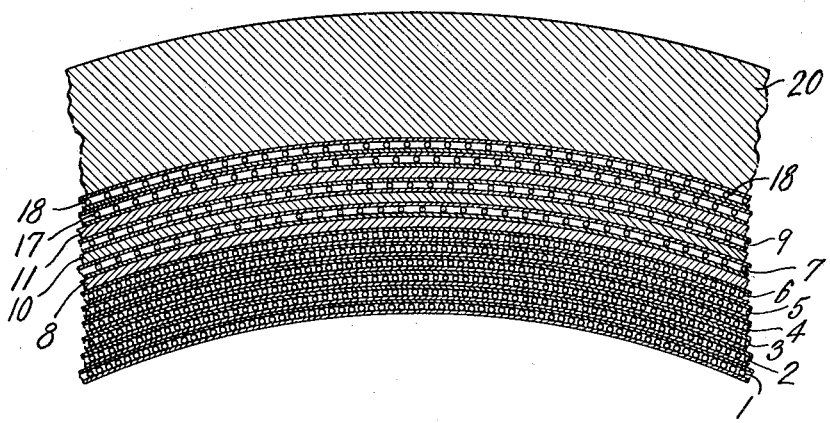
Fig. 2 is a transverse view of the crown portion of the tire previous to vulcanization.

Referring to the drawings, there is shown by way of illustration of the invention, an 8-ply tire. Reference numerals 1 to 6 inclusive illustrate successive fabric plies constituting the six inner plies of the tire carcass. These plies are illustrated as being formed of superimposed parallel cords with skim coatings of rubber. The skim coatings of the plies are clearly shown in Fig. 2, there being two layers of such skim coating interposed between each of the superimposed plies. The skim coating is usually of a soft stock, such as a zinc stock having no carbon black. The plies are constituted by parallel cords bonded together by the rubber coating. The cords of adjacent plies extend in opposite directions in order to "balance" the tire construction. An example of the spacing of such cords is 23 to the inch. It is to be understood, however, that square woven fabric may be substituted for the cord fabric herein illustrated, within the spirit of the invention.

A ply 7 is spaced from the ply 6 at the crown and along the outer side walls of the tire by a pad 8 of rubber. The pad 8 may be of a soft rubber compound similar to the skim coating of the plies 1 to 6 inclusive. The eighth or outer carcass ply 9 is spaced from the ply 7 by a soft rubber pad 10, so that the outer carcass plies are separated from each other by a cushioning pad or rubber. The spacing of the cords in the ply 9 is preferably greater than the spacing of the cords in plies 1 to 6 inclusive. Convenient spacings are from 21 to 13 cords per inch in lieu of the 23 cords per inch in the inner carcass plies. The use of the same number of cords per inch in plies 7 and 9 is desirable to preserve a condition of tire "balance". If other forms of fabric, including woven fabric, are utilized for the plies, the interstices of the outer carcass ply will be correspondingly enlarged. A cushioning pad 11, preferably of soft rubber, is placed externally of the ply 9. The widths of the cushioning pads 10 and 11 decrease progressively so as to gradually decrease the amount of cushioning rubber in the side walls of the tire.

Figure 3:
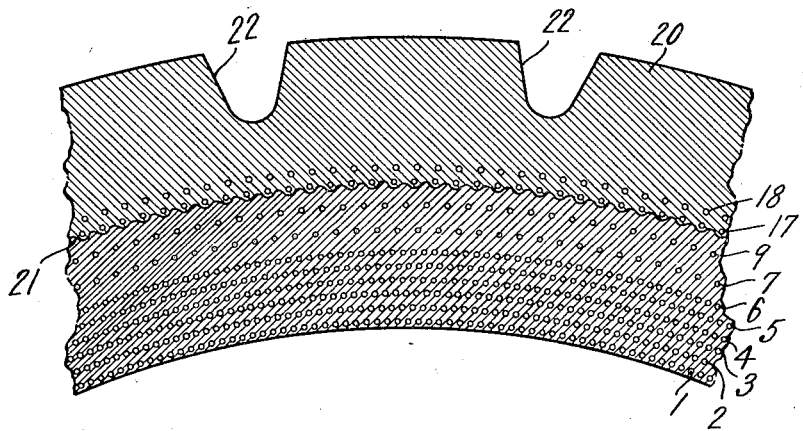
Fig. 3 is a view similar to Fig. 2 showing the condition of the tire after vulcanization.

With this construction as illustrated in Fig. 3, upon the vulcanization of the tire, the plies 7 and 9 are embedded in cushioning stock of a materially greater thickness than is the skim coating between the plies 1 to 6 inclusive. By reason of the larger spaces between the cords of the ply 9, substantial columns of rubber extend between adjacent cords. Blows which enter the zone of the outer cushioning pad 11 are, to a considerable extent, absorbed in the rubber embedding the plies 7 and 9 before such blows can be delivered to the substantially inextensible and inflexible portion of the carcass formed by the plies 1 to 6 inclusive.

The plies 1 to 9, inclusive, constituting the tire carcass, are folded around the usual bead rings 12 which are covered with flipper strips 14, 15 and 16, which may be of any construction.

Outside of the carcass so formed, protective plies 17 and 18 are disposed. These plies are illustrated as being formed of parallel cords having a wide spacing, similar to or greater than the spacing of the ply 9, a spacing of 13 cords to the inch being satisfactory. Instead of terminating at the shoulders of the tire, as is common in breaker strips, the protective strips 17 and 18 extend around the tire from heel portion to heel portion, thereby avoiding juncture lines between the fabric and rubber near the shoulder of the tire. Also, by extending the protective plies around the tire, blows delivered to them are distributed throughout the whole tire rather than being confined to the tread area. Chafing strips 19 are provided at the edges of the outer protective ply 18. It is to be understood that the number of protective plies may range from one to several in accordance with the intended duty of the tire.

The protective plies 17 and 18 are provided with surface coatings, but the rubber stock used for such coatings is preferably a tread stock containing carbon black in lieu of the soft or zinc stock used in the carcass. Tread rubber 20 is placed over the outer protective ply.

As shown in Fig. 3, upon vulcanization of the tire, the tread rubber 20 and the coatings for the plies 17 and 18 are merged and the interstices between the cords of the protective plies are filled with tread rubber so that the cords are embedded in the tread rubber. The juncture 21, illustrated by the wavy line in Fig. 3, between the tread rubber and the outer pad of soft rubber, is formed internally of the protective layers and along a surface which is substantially free from fabric. This gives a better bond between the tread rubber and protective plies and the carcass rubber than is possible in previous constructions where the tread rubber was bonded to a coating of soft rubber on the surface of a breaker strip, and the breaker strip was, in turn, bonded to the coating on the outer carcass ply. Tread configurations 22 are given to the tire during vulcanization.

A tire constructed according to the present invention is provided with outer protective fabric plies extending from tire heel to tire heel which are embedded in the tread rubber. Beneath the protective plies alternate layers of padding rubber and the outer carcass plies of the tire provide a cushion which serves to absorb shocks severe enough to pass beyond the tread rubber so that only the most extraordinary shocks can reach the inner carcass plies 1 to 6. This construction reduces failures due to localized strains by the gradual blending of the tread rubber to the rigid inner carcass plies.

While I have shown and described a present preferred embodiment of the invention, it is understood that the invention may be otherwise embodied within the spirit thereof and the scope of the appended claims.

Having thus described my invention, what I claim and desire to protect by Letters Patent is:

1. An uncured tire construction comprising a plurality of superimposed plies of rubberized parallel cords constituting a tire carcass, the cords in the outer carcass plies being spaced apart a distance greater than the cords in the inner plies, cushioning rubber disposed on opposite sides of said outer carcass plies, protective plies of cord fabric treated with tread stock disposed externally of the outer cushioning pad and having their cords spaced apart a distance at least as great as the spacing in the outer carcass ply, and tread stock disposed externally of said protective plies whereby upon vulcanization of the tire the tread stock is vulcanized between the cords of the protective plies and is bonded to the cushion stock interiorly of the protective plies.

2. An automobile tire comprising a carcass, protective plies of spaced apart parallel cords disposed externally of the carcass, a rubber tread constituting the outer portion of the tire and extending through the spaces between the cords of said protective plies whereby the latter are embedded in the tread rubber.

3. An automobile tire comprising a carcass having a plurality of superimposed plies of rubberized parallel cords, the cords of different plies extending at angles to the cords in the adjacent plies, the cords in the outer carcass ply being spaced apart a distance greater than the cords in the inner plies, cushioning pads of soft rubber disposed on opposite sides of said outer carcass ply, protective plies of cord fabric disposed externally of said outer cushioning pad, the spacing of the cords in said protective plies being greater than the spacing of the cords in the inner carcass plies, and tread rubber disposed externally of said protective plies and extending between and in direct engagement with the cords of said protective plies for embedding the cords and uniting with the rubber of the outer cushioning pad interiorly of said protective plies.

4. An automobile tire comprising a carcass of superimposed plies of fabric and rubber having softer characteristics than tread rubber, protective plies disposed externally of said carcass and tread rubber disposed externally of said protective plies, extending therethrough and uniting with the rubber of said carcass interiorly of said protective plies.

5. A tire construction comprising a plurality of layers of cord fabric, the cords of the outer pair of layers having relatively wider spacing than the spacing of the inner layers, and a rubber tread, the tread rubber extending between and in direct engagement with the cords of the outer layers whereby the cords of the outer layers are embedded in and bonded directly to the tread rubber.

6. A tire construction comprising an outer layer of cord fabric and a rubber tread, the tread rubber extending between and in direct engagement with the cords of said layer whereby the cords are embedded in and bonded directly to the tread rubber.

7. A tire construction comprising an outer layer of cord fabric extending between the bead portions of the tire and a rubber tread, the tread rubber extending between and in direct engagement with the cords of said layer whereby the cords are embedded in and bonded directly to the tread rubber.

ERNEST HOPKINSON.